(12) United States Patent
Shimomura et al.

(10) Patent No.: US 10,886,547 B2
(45) Date of Patent: Jan. 5, 2021

(54) FUEL CELL SYSTEM

(71) Applicant: Toyota Jidosha Kabushiki Kaisha, Toyota (JP)

(72) Inventors: Tetsuya Shimomura, Aichi-ken (JP); Masashi Maeda, Okazaki (JP); Norimitsu Takeuchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/270,885

(22) Filed: Feb. 8, 2019

(65) Prior Publication Data

US 2019/0252704 A1    Aug. 15, 2019

(30) Foreign Application Priority Data

Feb. 9, 2018    (JP) ................................. 2018-022229

(51) Int. Cl.
 *H01M 8/04746* (2016.01)
 *H01M 8/04082* (2016.01)

(52) U.S. Cl.
 CPC ... *H01M 8/04753* (2013.01); *H01M 8/04201* (2013.01)

(58) Field of Classification Search
 CPC .............. H01M 8/04753; H01M 8/04201
 See application file for complete search history.

(56) References Cited

U.S. PATENT DOCUMENTS

2011/0200896 A1    8/2011    Hasegawa et al.
2015/0207158 A1    7/2015    Nanba et al.

FOREIGN PATENT DOCUMENTS

| JP | 2004-273162 A | 9/2004 |
|----|---------------|--------|
| JP | 2009-158230 A | 7/2009 |
| JP | 2010-251096 A | 11/2010 |
| JP | 2010-538415 A | 12/2010 |
| JP | 2013-134866 A | 7/2013 |
| WO | 2014-017028 A1 | 1/2014 |

*Primary Examiner* — Osei K Amponsah
(74) *Attorney, Agent, or Firm* — Dinsmore & Shohl LLP (57) ABSTRACT

A fuel cell system includes: a fuel cell including a fuel gas passage through which a fuel gas flows and an oxidant gas passage through which an oxidant gas flows, an inlet of the fuel gas passage being located closer to an outlet of the oxidant gas passage than to an inlet of the oxidant gas passage, an outlet of the fuel gas passage being located closer to the inlet of the oxidant gas passage than to the outlet of the oxidant gas passage; an oxidant gas supply unit supplying the oxidant gas to the fuel cell; and a supply amount controller configured to control the oxidant gas supply unit, the supply amount controller is configured to control the oxidant gas supply unit so that a stoichiometric ratio of the oxidant gas in a high-temperature high output power state is greater than that in a high-temperature low output power state.

7 Claims, 9 Drawing Sheets

FUEL CELL SYSTEM

CROSS-REFERENCE TO RELATED APPLICATION

This application is based upon and claims the benefit of priority of the prior Japanese Patent Application No. 2018-022229, filed on Feb. 9, 2018, the entire contents of which are incorporated herein by reference.

TECHNICAL FIELD

The present disclosure relates to a fuel cell system.

BACKGROUND

It has been known that the vicinity of the inlet of the oxidant gas passage (in other words, the vicinity of the outlet of the fuel gas passage) tends to dry in fuel cells in which a fuel gas and an oxidant gas flow in a counter-flow manner. A method that increases the fuel gas flow rate and/or reduces the fuel gas pressure to reduce drying of the vicinity of the inlet of the oxidant gas passage when the vicinity of the inlet of the oxidant gas passage is dry is known as disclosed in, for example, Japanese Patent Application Publication No. 2010-538415. In addition, it has been known that the vicinity of the inlet of the fuel gas passage tends to dry due to increase in fuel gas flow rate by increased output power when power is generated while the temperature of the fuel cell is high. For example, it has been known to make the stoichiometric ratio of the oxidant gas lower than that under the normal condition and/or make the stoichiometric ratio of the fuel gas lower than that under the normal condition to reduce drying of the vicinity of the inlet of the fuel gas passage when power with a current density of 1.4 A/cm$^2$ or greater is generated, as disclosed in, for example, International Publication No. 2014/017028.

SUMMARY

It is an object in one aspect of embodiments to provide a fuel cell system that improves the power generation performance.

The above object is achieved by a fuel cell system including: a fuel cell including a fuel gas passage through which a fuel gas flows and an oxidant gas passage through which an oxidant gas flows, an inlet of the fuel gas passage being located closer to an outlet of the oxidant gas passage than to an inlet of the oxidant gas passage, an outlet of the fuel gas passage being located closer to the inlet of the oxidant gas passage than to the outlet of the oxidant gas passage; an oxidant gas supply unit supplying the oxidant gas to the fuel cell; and a supply amount controller configured to control the oxidant gas supply unit to control a supply amount of the oxidant gas to the fuel cell, wherein the supply amount controller is configured to control the oxidant gas supply unit so that a stoichiometric ratio of the oxidant gas in a high-temperature high output power state is greater than a stoichiometric ratio of the oxidant gas in a high-temperature low output power state, the high-temperature high output power state being a state where a temperature of the fuel cell is higher than a predetermined temperature and a power generation amount of the fuel cell is greater than a predetermined power generation amount, the high-temperature low output power state being a state where the temperature of the fuel cell is higher than the predetermined temperature and the power generation amount of the fuel cell is equal to or less than the predetermined power generation amount.

In the above configuration, a fuel gas supply unit supplying the fuel gas to the fuel cell may be provided, the supply amount controller may be configured to control the fuel gas supply unit to control a supply amount of the fuel gas to the fuel cell, and the supply amount controller may be configured to control the fuel gas supply unit so that a stoichiometric ratio of the fuel gas in the high-temperature high output power state is less than a stoichiometric ratio of the fuel gas in the high-temperature low output power state.

In the above configuration, the supply amount controller may be configured to control the oxidant gas supply unit so that the stoichiometric ratio of the oxidant gas in the high-temperature high output power state is greater than the stoichiometric ratio of the oxidant gas in the high-temperature low output power state and a stoichiometric ratio of the oxidant gas when the temperature of the fuel cell is equal to or less than the predetermined temperature.

In the above configuration, the supply amount controller may be configured to control the oxidant gas supply unit so that the stoichiometric ratio of the oxidant gas in the high-temperature high output power state is greater than the stoichiometric ratio of the oxidant gas in the high-temperature low output power state and a stoichiometric ratio of the oxidant gas when the temperature of the fuel cell is equal to or less than the predetermined temperature, and the supply amount controller may be configured to control the fuel gas supply unit so that the stoichiometric ratio of the fuel gas in the high-temperature high output power state is a value between the stoichiometric ratio of the fuel gas in the high-temperature low output power state and a stoichiometric ratio of the fuel gas when the temperature of the fuel cell is equal to or less than the predetermined temperature.

In the above configuration, the predetermined temperature may be 70° C. or greater.

In the above configuration, the power generation amount of the fuel cell may be considered to be greater than the predetermined power generation amount when a current density of the fuel cell is greater than a predetermined current density of 1.0 A/cm$^2$ or greater.

In the above configuration, the power generation amount of the fuel cell may be considered to be greater than the predetermined power generation amount when a voltage of the fuel cell is less than a predetermined voltage of 0.75 V or less.

DETAILED DESCRIPTION

When the temperature of the fuel cell is high, and the power generation amount by the fuel cell is large, there is still room for improvement in reduction in drying of the fuel cell and increase in power generation performance.

Hereinafter, with reference to the attached drawings, embodiments of the present disclosure will be described.

First Embodiment

Figure 1:
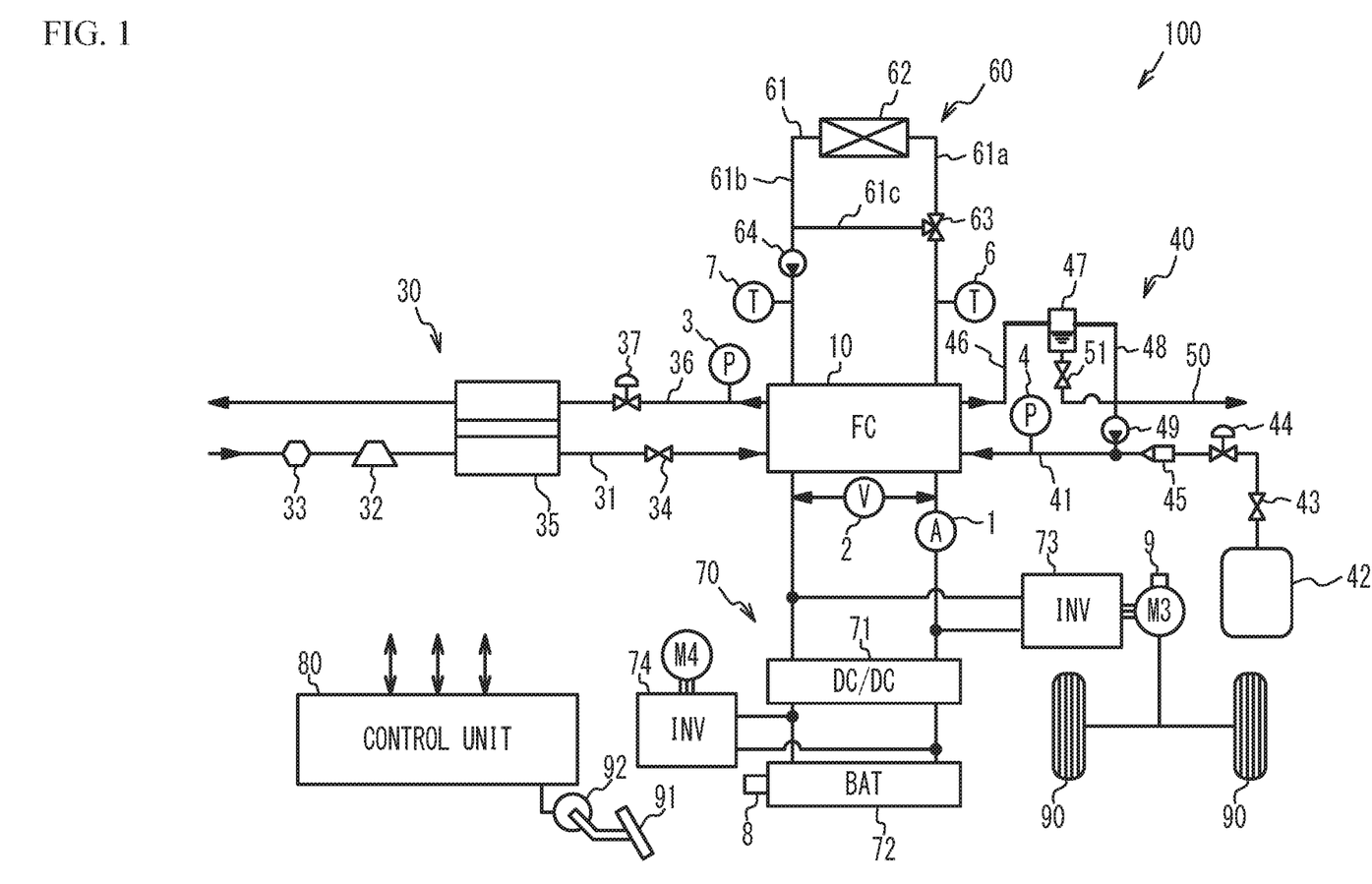
FIG. 1 is a schematic diagram illustrating a structure of a fuel cell system in accordance with a first embodiment.

FIG. 1 is a schematic diagram illustrating a structure of a fuel cell system in accordance with a first embodiment. The fuel cell system is installed on, for example, a fuel cell vehicle, and outputs electric power used as drive power in accordance with the request from the driver. As illustrated in FIG. 1, a fuel cell system 100 includes a fuel cell 10, an oxidant gas piping system 30, a fuel gas piping system 40, a coolant piping system 60, a power system 70, and a control unit 80. The oxidant gas piping system 30 supplies an oxidant gas (e.g., air), referred to as a cathode gas, to the fuel cell 10, and discharges an oxidant exhaust gas that has not been consumed in the fuel cell 10. The fuel gas piping system 40 supplies a fuel gas (e.g., hydrogen), referred to as an anode gas, to the fuel cell 10, and discharges a fuel exhaust gas that has not been consumed in the fuel cell 10. The coolant piping system 60 circulates coolant, which cools the fuel cell 10, through the fuel cell 10. The power system 70 charges and discharges the electric power of the system. The control unit 80 overall controls the entire system. A current sensor 1 and a voltage sensor 2 are installed to the fuel cell 10. The current sensor 1 is connected to a direct current (DC) wiring line of the fuel cell 10, measures the current value output from the fuel cell 10, and transmits the measured current value to the control unit 80. The voltage sensor 2 is connected between unit cells of the fuel cell 10, measures the voltage across the fuel cell 10, and transmits the measured voltage to the control unit 80.

Figure 2A:
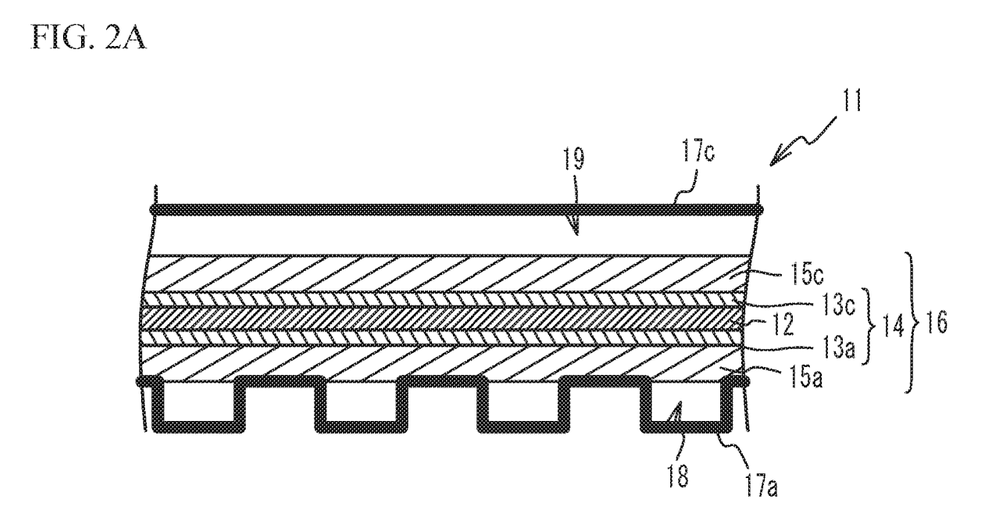
FIG. 2A is a cross-sectional view of a unit cell.
Figure 2B:
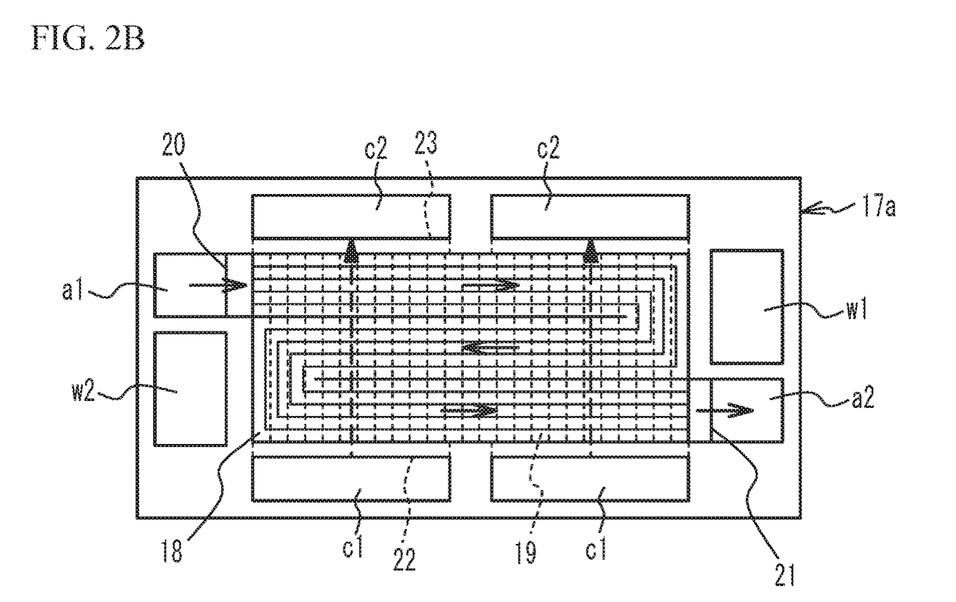
FIG. 2B is a plan view of the unit cell as viewed from an anode separator side.

The fuel cell 10 is a polymer electrolyte fuel cell that is supplied with the oxidant gas and the fuel gas to generate power. The fuel cell 10 has a stack structure having a plurality of unit cells stacked. FIG. 2A is a cross-sectional view of the unit cell, and FIG. 2B is a plan view of the unit cell as viewed from an anode separator side. As illustrated in FIG. 2A, a unit cell 11 includes a Membrane Electrode Gas diffusion layer Assembly (hereinafter, referred to as a MEGA) 16, and an anode separator 17a and a cathode separator 17c sandwiching the MEGA 16. The MEGA 16 includes an anode gas diffusion layer 15a and a cathode gas diffusion layer 15c, and a Membrane Electrode Assembly (hereinafter, referred to as an MEA) 14.

The MEA 14 includes an electrolyte film 12, an anode catalyst layer 13a located on a first surface of the electrolyte film 12, and a cathode catalyst layer 13c located on a second surface of the electrolyte film 12. The electrolyte film 12 is a solid polymer film formed of, for example, a fluorine-based resin material having a sulfonic acid group or a hydrocarbon-based resin material having a sulfonic acid group, and has good protonic conductivity in wet condition. The anode catalyst layer 13a and the cathode catalyst layer 13c contain carbon particles (carbon black or the like) carrying a catalyst (such as platinum or platinum-cobalt alloy), which speeds up the rate of an electrochemical reaction, and ionomer, which is solid polymer having a sulfonic acid group and has good protonic conductivity in wet condition.

The anode gas diffusion layer 15a and the cathode gas diffusion layer 15c are formed of members having gas permeability and electron conductivity, and are formed of porous fiber members such as, for example, carbon fiber or graphitic fiber.

The anode separator 17a and the cathode separator 17c are formed of members having a gas barrier property and electron conductivity. For example, the anode separator 17a and the cathode separator 17c are formed of metal members that are made of stainless steel, aluminum, or titanium and have uneven shapes formed by bending by press molding, or carbon members made of dense carbon formed by compressing carbon so as to have a gas barrier property.

As illustrated in FIG. 2B, the anode separator 17a has a substantially rectangular shape, and has an anode inlet a1, to which the fuel gas is supplied, an anode outlet a2, from which the fuel gas is discharged, a cathode inlet c1, to which the oxidant gas is supplied, a cathode outlet c2, from which the oxidant gas is discharged, a coolant inlet w1, to which coolant is supplied, and a coolant outlet w2, from which coolant is discharged, formed in its peripheral portion. Although the illustration is omitted, as with the anode separator 17a, the cathode separator 17c also has a substantially rectangular shape, and has the anode inlet a1, the anode outlet a2, the cathode inlet c1, the cathode outlet c2, the coolant inlet w1, and the coolant outlet w2 formed therein. The anode inlets a1 of a plurality of the unit cells 11 define a fuel gas supply manifold, the anode outlets a2 of the unit cells 11 define a fuel gas exhaust manifold, the cathode inlets c1 of the unit cells 11 define an oxidant gas supply manifold, and the cathode outlets c2 of the unit cells 11 define an oxidant gas exhaust manifold. The coolant inlets w1 of the unit cells 11 define a coolant supply manifold, and the coolant outlets w2 of the unit cells 11 define a coolant exhaust manifold.

The anode inlet a1 and the coolant outlet w2 are formed next to each other in the short direction at a first side of the short sides of each of the anode separator 17a and the cathode separator 17c. The coolant inlet w1 and the anode outlet a2 are formed next to each other in the short direction at a second side of the short sides of each of the anode separator 17a and the cathode separator 17c. The two cathode inlets c1 are formed next to each other in the long direction at a first side of the long sides of each of the anode separator 17a and the cathode separator 17c. The two cathode outlets c2 are formed next to each other in the long direction at a second side of the long sides of each of the anode separator 17a and the cathode separator 17c.

A fuel gas passage 18 through which the fuel gas flows is formed in the center of the anode separator 17a. The fuel gas passage 18 is a so-called serpentine passage, and guides the fuel gas from the anode inlet a1 to the anode outlet a2. The fuel gas passage 18 substantially linearly extends from the anode inlet a1 toward the coolant inlet w1 substantially in parallel to the long side of the anode separator 17a, bends near the coolant inlet w1, and substantially linearly extends from the coolant inlet w1 toward the coolant outlet w2 substantially in parallel to the long side of the anode separator 17a. The fuel gas passage 18 bends near the coolant outlet w2, and substantially linearly extends from the coolant outlet w2 toward the anode outlet a2 substantially in parallel to the long side of the anode separator 17a. The direction in which the fuel gas flows is indicated by solid line arrows. The positions of the coolant inlet w1 and the coolant outlet w2 are not particularly limited. For example, the coolant inlet w1 and the coolant outlet w2 may be arranged in an opposite manner to those illustrated in FIG. 2B, and the direction in which coolant flows may be opposite to the direction in FIG. 2B.

Oxidant gas passages 19, which guide the oxidant gas from the cathode inlet c1 to the cathode outlet c2, are formed in the cathode separator 17c. In FIG. 2B, the oxidant gas passages 19 are indicated by dashed lines. The oxidant gas passage 19 substantially linearly extends along the short side direction of the cathode separator 17c. The direction in which the oxidant gas flows is indicated by dashed line arrows.

The anode inlet a1 is located closer to the cathode outlet c2 than to the cathode inlet c1, and the anode outlet a2 is located closer to the cathode inlet c1 than to the cathode outlet c2. Thus, an inlet 20 of the fuel gas passage 18 is located closer to an outlet 23 of the oxidant gas passage 19 than to an inlet 22 of the oxidant gas passage 19, and an outlet 21 of the fuel gas passage 18 is located closer to the inlet 22 of the oxidant gas passage 19 than to the outlet 23 of the oxidant gas passage 19. That is, the fuel gas passing through the fuel gas passage 18 and the oxidant gas passing through the oxidant gas passage 19 flow substantially in a substantially counter-flow manner.

As illustrated in FIG. 1, the oxidant gas piping system 30 includes an oxidant gas supply pipe 31, an air compressor 32, an air flow meter 33, an opening/closing valve 34, a humidifying module 35, an oxidant gas exhaust pipe 36, a regulating valve 37, and a pressure sensor 3. The humidifying module 35 may not be necessarily provided. The oxidant gas supply pipe 31 is a pipe coupled to the inlet of the cathode of the fuel cell 10. The air compressor 32 is coupled to the fuel cell 10 through the oxidant gas supply pipe 31, takes in external air, and supplies compressed air to the fuel cell 10 as a cathode gas. The air compressor 32 is an example of an oxidant gas supply unit that supplies the oxidant gas to the fuel cell 10. The air flow meter 33 is installed further upstream than the air compressor 32, measures the volume of air introduced to the air compressor 32, and transmits the measured volume to the control unit 80. The control unit 80 controls the drive of the air compressor 32 based on the measured value by the air flow meter 33 to control the supply amount of air to the fuel cell 10.

The opening/closing valve 34 is located between the air compressor 32 and the fuel cell 10, and opens and closes in accordance with the flow of air in the oxidant gas supply pipe 31. For example, the opening/closing valve 34 is in a close state in normal times, and opens when air with a predetermined pressure flows through the oxidant gas supply pipe 31 from the air compressor 32. The humidifying module 35 humidifies high-pressure air delivered from the air compressor 32. The humidifying module 35 is also coupled to the oxidant gas exhaust pipe 36, and uses water of the cathode exhaust gas to humidify high-pressure air.

The oxidant gas exhaust pipe 36 is a pipe coupled to the outlet of the cathode of the fuel cell 10, and discharges the cathode exhaust gas to the outside of the fuel cell system 100. The regulating valve 37 adjusts the pressure of the cathode exhaust gas in the oxidant gas exhaust pipe 36 (back pressure at the cathode side of the fuel cell 10). The pressure sensor 3 is installed further upstream than the regulating valve 37, measures the pressure of the cathode exhaust gas, and transmits the measured pressure to the control unit 80. The control unit 80 adjusts the opening degree of the regulating valve 37 based on the measured value by the pressure sensor 3.

The fuel gas piping system 40 includes a fuel gas supply pipe 41, a hydrogen tank 42, an opening/closing valve 43, a regulator 44, a hydrogen supply unit 45, a pressure sensor 4, a fuel gas exhaust pipe 46, a gas-liquid separator 47, a fuel gas circulation pipe 48, a circulation pump 49, an anode drainage pipe 50, and a drain valve 51. The hydrogen tank 42 is coupled to the inlet of the anode of the fuel cell 10 through the fuel gas supply pipe 41. The opening/closing valve 43, the regulator 44, the hydrogen supply unit 45, and the pressure sensor 4 are arranged in the fuel gas supply pipe 41 in this order from the upstream side (the hydrogen tank 42 side).

The opening/closing valve 43 opens and closes in accordance with instructions from the control unit 80, and controls the flow of hydrogen into a part, further upstream than the hydrogen supply unit 45, of the fuel gas supply pipe 41 from the hydrogen tank 42. The regulator 44 is a pressure reducing valve for adjusting the pressure of hydrogen in the part further upstream than the hydrogen supply unit 45, and its opening degree is controlled by the control unit 80. The hydrogen supply unit 45 is composed of an injector that is, for example, an electromagnetic opening/closing valve, and supplies hydrogen as an anode gas from the hydrogen tank 42 to the fuel cell 10. The hydrogen supply unit 45 is an example of a fuel gas supply unit that supplies a fuel gas to the fuel cell 10. The pressure sensor 4 measures the pressure of hydrogen in a part, further downstream than the hydrogen supply unit 45, of the fuel gas supply pipe 41, and transmits the measured pressure to the control unit 80. The control unit 80 controls the amount of hydrogen to be supplied to the fuel cell 10 by controlling the hydrogen supply unit 45 based on the measured value by the pressure sensor 4.

The fuel gas exhaust pipe 46 is a pipe connecting the outlet of the anode of the fuel cell 10 and the gas-liquid separator 47, and guides the anode exhaust gas containing unreacted gas (hydrogen, nitrogen, or the like), which was not used in power generation reaction, to the gas-liquid separator 47. The gas-liquid separator 47 is coupled to the fuel gas circulation pipe 48 and the anode drainage pipe 50. The gas-liquid separator 47 separates a gas component and water contained in the anode exhaust gas, guides the gas component to the fuel gas circulation pipe 48, and guides water to the anode drainage pipe 50. The fuel gas circulation pipe 48 is coupled to the fuel gas supply pipe 41 at the position located further downstream than the hydrogen supply unit 45. The circulation pump 49 is provided in the fuel gas circulation pipe 48. Hydrogen contained in the gas component separated in the gas-liquid separator 47 is delivered to the fuel gas supply pipe 41 by the circulation pump 49. As described above, the fuel cell system 100 circulates hydrogen contained in the anode exhaust gas to supply hydrogen to the fuel cell 10 again, thereby improving the use efficiency of hydrogen.

The anode drainage pipe 50 is a pipe for discharging water separated in the gas-liquid separator 47 to the outside of the fuel cell system 100. The drain valve 51 is provided in the anode drainage pipe 50, and opens and closes in accordance with instructions from the control unit 80. During operation of the fuel cell system 100, the control unit 80 closes the drain valve 51 in normal times and opens the drain valve 51 at a predetermined drainage timing or at the timing for discharging an inert gas in the anode exhaust gas.

The coolant piping system 60 includes a coolant pipe 61, a radiator 62, a three-way valve 63, a circulation pump 64, and temperature sensors 6 and 7. The coolant pipe 61 is a pipe for circulating coolant for cooling the fuel cell 10, and is composed of an upstream pipe 61a, a downstream pipe 61b, and a bypass pipe 61c. The upstream pipe 61a connects the outlet of the coolant exhaust manifold located in the fuel cell 10 and the inlet of the radiator 62. The downstream pipe 61b connects the inlet of the coolant supply manifold located in the fuel cell 10 and the outlet of the radiator 62. A first end of the bypass pipe 61c is coupled to the upstream pipe 61a through the three-way valve 63, and a second end of the bypass pipe 61c is coupled to the downstream pipe 61b. The control unit 80 adjusts the amount of coolant flowing into the bypass pipe 61c by controlling the opening/closing of the three-way valve 63, thereby controlling the amount of coolant flowing into the radiator 62.

The radiator 62 is located in the coolant pipe 61, and exchanges heat between coolant flowing through the coolant pipe 61 and external air to cool the coolant. The circulation pump 64 is located further downstream (is located closer to the fuel cell 10) than the part to which the bypass pipe 61c is connected in the downstream pipe 61b, and drives based on instructions from the control unit 80. The temperature sensors 6 and 7 are respectively located in the upstream pipe 61a and the downstream pipe 61b, measure the temperature of coolant, and transmit the measured values to the control unit 80. The control unit 80 detects the temperature of the fuel cell 10 based on, for example, the measured value by the temperature sensor 6. Alternatively, the control unit 80 detects the temperature difference inside the fuel cell 10 based on, for example, the difference in measured values between the temperature sensors 6 and 7. The control unit 80 controls the rotation speed of the circulation pump 64 based on the detected temperature of the fuel cell 10 or the detected temperature difference to adjust the temperature of the fuel cell 10.

The power system 70 includes a high-pressure DC/DC converter 71, a battery 72, a traction inverter 73, an auxiliary machine inverter 74, a traction motor M3, and an auxiliary machine motor M4. The high-pressure DC/DC converter 71 can adjust the DC voltage from the battery 72 and output the adjusted DC voltage to the traction inverter 73, and can adjust the DC voltage from the fuel cell 10 or the voltage from the traction motor M3, which has been converted into the DC voltage by the traction inverter 73, and output the adjusted voltage to the battery 72. The high-pressure DC/DC converter 71 controls the output voltage of the fuel cell 10.

The battery 72 is a secondary battery that can be charged and discharged, and can charge surplus power and supply auxiliary power. A part of the DC power generated in the fuel cell 10 is stepped-up/down by the high-pressure DC/DC converter 71, and the battery 72 is charged. An SOC sensor 8, which detects the state of charge, is installed in the battery 72.

The traction inverter 73 and the auxiliary machine inverter 74 convert the DC power output from the fuel cell 10 or the battery 72 to three-phase alternate-current (AC) power, and supplies the three-phase AC power to the traction motor M3 and the auxiliary machine motor M4. The traction motor M3 drives wheels 90. A rotation speed detecting sensor 9, which detects the rotation speed of the traction motor M3, is installed in the traction motor M3. The auxiliary machine motor M4 is a motor for driving auxiliary machines.

The control unit 80 includes a microcomputer including a Central Processing Unit (CPU), a Random Access Memory (RAM), a Read Only Memory (ROM), and the like. The control unit 80 controls each unit of the fuel cell system 100 based on each input sensor signal in an integrated manner to control the operation of the fuel cell system 100. For example, the control unit 80 calculates the requested output value to the fuel cell 10 based on sensor signals transmitted from an accelerator pedal sensor 92, which detects the pivoting of an accelerator pedal 91, the SOC sensor 8, and the rotation speed detecting sensor 9. The ROM stores operation programs for the fuel cell system 100, and various maps and various threshold values used for the control of the fuel cell system 100. The control unit 80 controls the valves, the circulation pump, the air compressor, and the like based on, for example, sensor signals, and controls the operation of the fuel cell system 100 including the process for reducing drying of the fuel cell 10 described later. The control unit 80 functions as a supply amount controller in the drying reduction process.

Figure 3A:
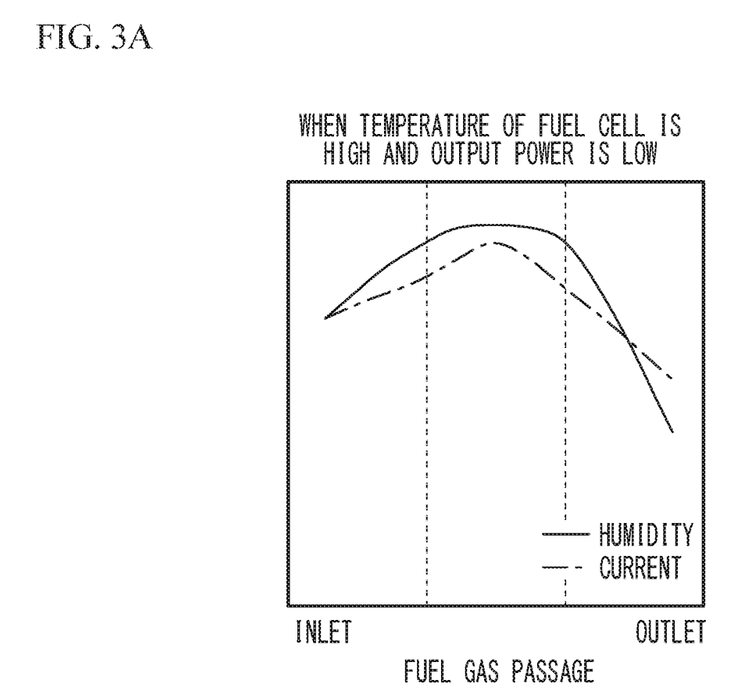
FIG. 3A illustrates a diagram of humidity distribution when power is generated while the temperature of the fuel cell is high and the output power is low.
Figure 3B:
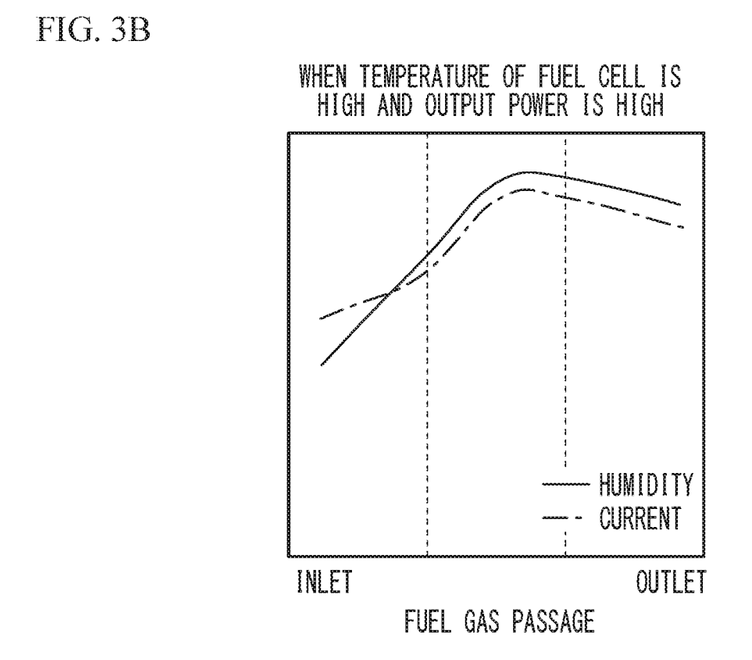
FIG. 3B illustrates a diagram of humidity distribution when power is generated while the temperature of a fuel cell is high and the output power is high.

Here, a description will be given of problems that arise when power is generated while the temperature of the fuel cell 10, in which the fuel gas and the oxidant gas flow in a counter-flow manner, is high. FIG. 3A and FIG. 3B are diagrams for describing problems that arise when power is generated while the temperature of the fuel cell is high. FIG. 3A illustrates the humidity distribution and the generated current density distribution of the fuel cell 10 from the inlet 20 of the fuel gas passage 18 to the outlet 21 of the fuel gas passage 18 when the temperature of the fuel cell 10 is high and the output power is low (the power generation amount is low). FIG. 3B illustrates the humidity distribution and the generated current density distribution of the fuel cell 10 from the inlet 20 of the fuel gas passage 18 to the outlet 21 of the fuel gas passage 18 when the temperature of the fuel cell 10 is high and the output power is high (the power generation amount is high). In FIG. 3A and FIG. 3B, the humidity distributions are indicated by solid lines, and the generated current density distributions are indicated by chain lines.

As illustrated in FIG. 3A, when the temperature of the fuel cell 10 is high and the output power is low, the humidity in the vicinity of the outlet 21 of the fuel gas passage 18 is low, resulting in low power generation performance in the vicinity of the outlet 21 of the fuel gas passage 18. The reason why the humidity in the vicinity of the outlet 21 of the fuel gas passage 18 is low is as follows. Since the amount of water produced through the power generation is low and a dry oxidant gas flows into the oxidant gas passage 19 when the output power is low, the vicinity of the inlet 22 of the oxidant gas passage 19 tends to dry. As a result, the vicinity of the outlet 21 of the fuel gas passage 18 tends to dry.

As illustrated in FIG. 3B, when the temperature of the fuel cell 10 is high and the output power is high, the humidity in the vicinity of the inlet 20 of the fuel gas passage 18 is low, resulting in low power generation performance in the vicinity of the inlet 20 of the fuel gas passage 18. The reason why the humidity in the vicinity of the inlet 20 of the fuel gas passage 18 is low is as follows. Since a large amount of dry fuel gas is supplied to the fuel gas passage 18, the vicinity of the inlet 20 of the fuel gas passage 18 tends to dry. In addition, when the anode exhaust gas is circulated to be supplied to the fuel cell 10 again, the humidified fuel gas also flows into the fuel gas passage 18. However, since the temperature of the fuel cell 10 is high, the relative humidity becomes low, and as a result, the vicinity of the inlet 20 of the fuel gas passage 18 tends to dry.

Figure 4:
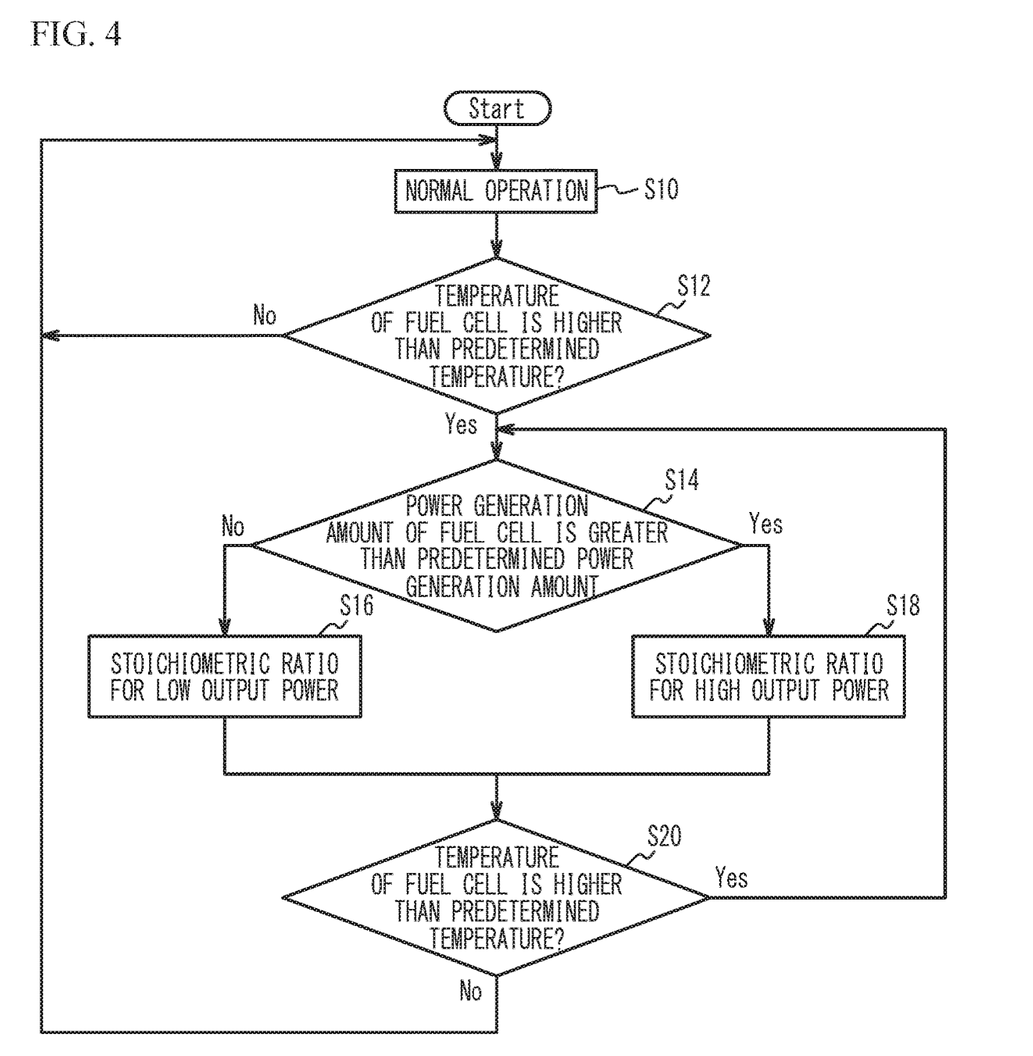
FIG. 4 is a flowchart of a drying reduction process.

Next, a description will be given of a control for reducing drying when the temperature of the fuel cell 10 is high and improving the power generation performance. FIG. 4 is a flowchart illustrating a drying reduction process. The determination and the control at each step in FIG. 4 are repeated during the power generation by the fuel cell 10. As illustrated in FIG. 4, when the fuel cell system 100 is started, the control unit 80 executes normal operation that causes the fuel cell 10 to generate power based on the drive request to the fuel cell vehicle from the driver (step S10). The normal operation means an operation in the state where the temperature of the fuel cell 10 is not high. The control unit 80 preliminarily stores information indicating the power generation characteristics, such as the current-voltage characteristics (I-V characteristics) and the current-power characteristics (I-P characteristics), of the fuel cell 10. The control unit 80 operates the fuel cell 10 based on the I-V characteristics and the I-P characteristics. In the normal operation, as the stoichiometric ratios of the fuel gas and the oxidant gas supplied to the fuel cell 10, the stoichiometric ratio of the fuel gas is set to 1.25, and the stoichiometric ratio of the oxidant gas is set to 1.5, for example. Here, the stoichiometric ratio is a ratio of the actual supplied amount of the reaction gas to the amount of the reaction gas theoretically necessary for the power generation amount of the fuel cell (the theoretical consumption amount of the reaction gas).

Next, during execution of the normal operation, the control unit 80 determines, every predetermined time (e.g., every 100 msec), whether the fuel cell 10 is in a high temperature state, that is, whether the temperature of the fuel cell 10 is higher than a predetermined temperature preliminarily stored (step S12). The temperature of the fuel cell 10 can be obtained based on, for example, the temperature sensor 6. The predetermined temperature is, for example, 70° C. Thus, the control unit 80 determines, for example, whether the temperature of the fuel cell 10 is higher than 70° C. The predetermined time is not particularly limited, and may be 10 msec or 1 sec.

Figure 5:
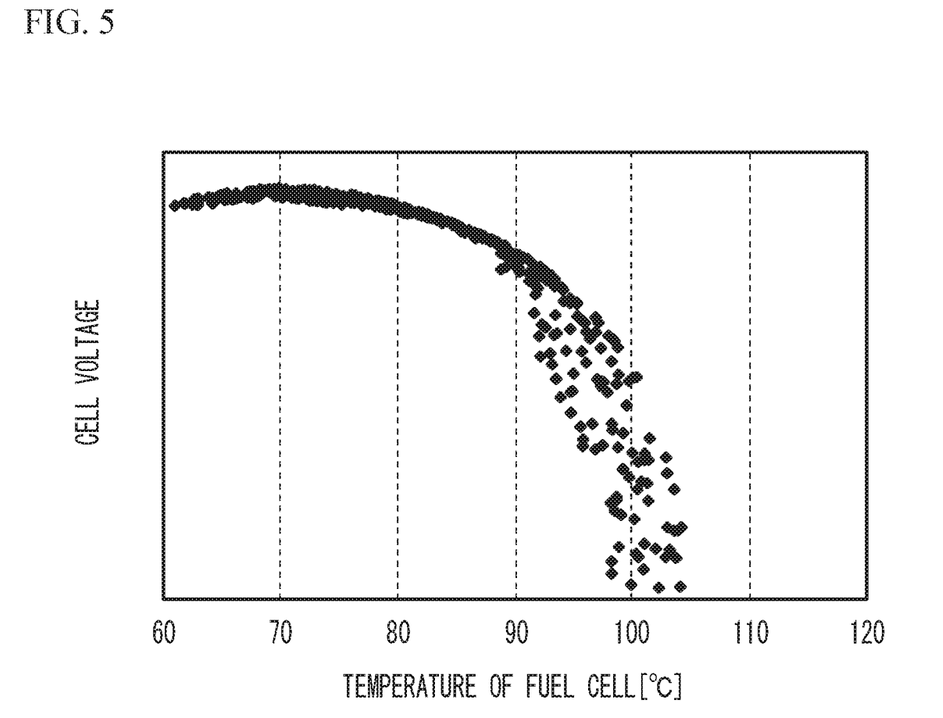
FIG. 5 illustrates a relationship between the temperature of the fuel cell and the cell voltage.

Here, the reason why the predetermined temperature is 70° C. will be described. FIG. 5 illustrates a relationship between the temperature of the fuel cell and the cell voltage. The horizontal axis in FIG. 5 represents the temperature of the fuel cell 10 measured by the temperature sensor 6. The vertical axis in FIG. 5 represents the cell voltage when the current density is 3.2 A/cm². As illustrated in FIG. 5, when the temperature of the fuel cell 10 exceeds 70° C., drying of the electrolyte film 12 proceeds, and the power generation performance decreases. Since the drying reduction process executed according to the flowchart in FIG. 4 aims to reduce drying at high temperatures, the predetermined temperature is set to 70° C. based on the results in FIG. 5. When the temperature of the fuel cell 10 is 70° C. or greater, drying of the electrolyte film 12 proceeds, and the power generation performance decreases. In some embodiments, the predetermined temperature is 70° C. or greater, may be 80° C. or greater, or may be 90° C. or greater.

When determining that the temperature of the fuel cell 10 is equal to or less than the predetermined temperature (step S12: No), the control unit 80 continues the normal operation (step S10). On the other hand, when determining that the temperature of the fuel cell 10 is higher than the predetermined temperature (step S12: Yes), the control unit 80 determines whether the power generation amount of the fuel cell 10 is greater than a predetermined power generation amount (step S14). For example, the control unit 80 determines whether the current density of the fuel cell 10 is greater than 1.0 A/cm². The current density of the fuel cell 10 can be calculated based on, for example, the current value measured by the current sensor 1. The details of the predetermined power generation amount will be described later.

When determining that the power generation amount of the fuel cell 10 is equal to or less than the predetermined power generation amount (step S14: No), the control unit 80 sets the respective stoichiometric ratios of the fuel gas and the oxidant gas to the stoichiometric ratios for low output power (step S16). For example, the stoichiometric ratio of the fuel gas is set to 1.66, and the stoichiometric ratio of the oxidant gas is set to 1.3. Hereinafter, the state where the temperature of the fuel cell 10 is higher than the predetermined temperature and the power generation amount is equal to or less than the predetermined power generation amount may be referred to as a high-temperature low output power state. On the other hand, when determining that the power generation amount of the fuel cell 10 is greater than the predetermined power generation amount (step S14: Yes), the control unit 80 sets the respective stoichiometric ratios of the fuel gas and the oxidant gas to the stoichiometric ratios for high output power (step S18). For example, the stoichiometric ratio of the fuel gas is set to 1.66, which is equal to the stoichiometric ratio for low output power, and the stoichiometric ratio of the oxidant gas is set to 1.65, which is higher than the stoichiometric ratio for low output power. Hereinafter, the state where the temperature of the fuel cell 10 is higher than the predetermined temperature and the power generation amount is greater than the predetermined power generation amount may be referred to as a high-temperature high output power state. The control unit 80 can control the stoichiometric ratio of the fuel gas by controlling the hydrogen supply unit 45 to control the supply amount of the fuel gas, and can control the stoichiometric ratio of the oxidant gas by controlling the air compressor 32 to control the supply amount of the oxidant gas.

Then, the control unit 80 determines whether the temperature of the fuel cell 10 continues to be higher than the predetermined temperature (step S20). When the temperature of the fuel cell 10 continues to be higher than the predetermined temperature (step S20: Yes), the process returns to step S14. When the temperature of the fuel cell 10 becomes equal to or less than the predetermined temperature (step S20: No), the process returns to step S10.

As described above, in the first embodiment, when the fuel cell 10 is in the high-temperature high output power state, the stoichiometric ratio of the oxidant gas is made to be greater than the stoichiometric ratio of the oxidant gas when the fuel cell 10 is in the high-temperature low output power state. Here, a case where the stoichiometric ratio of the oxidant gas is controlled to be equal to the stoichiometric ratio of the oxidant gas in the high-temperature low output power state even when the fuel cell 10 is in the high-temperature high output power state is defined as a first comparative example. That is, in the first comparative example, both the stoichiometric ratio of the fuel gas and the stoichiometric ratio of the oxidant gas are the same between the high-temperature high output power state and the high-temperature low output power state. Table 1 lists the examples of the stoichiometric ratio of the fuel gas and the stoichiometric ratio of the oxidant gas in the first embodiment and the first comparative example.

TABLE 1

|  |  | Fuel gas stoichiometric ratio | Oxidant gas stoichiometric ratio |
|---|---|---|---|
| First embodiment | High-temperature low output power state | 1.66 | 1.3 |
|  | High-temperature high output power state | 1.66 | 1.65 |
| First comparative example | High-temperature low output power state | 1.66 | 1.3 |
|  | High-temperature high output power state | 1.66 | 1.3 |

Figure 6A:
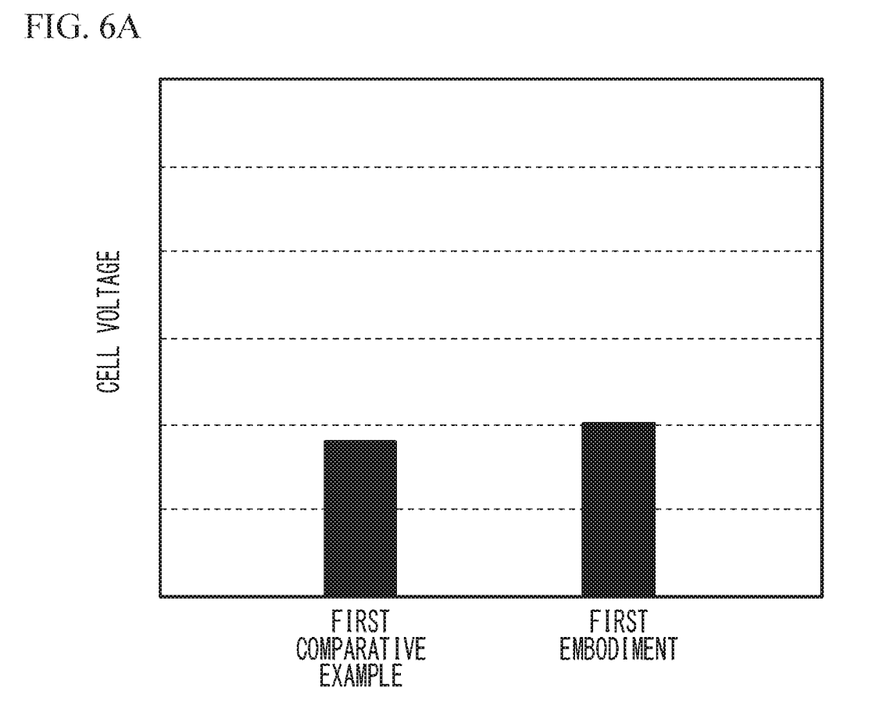
FIG. 6A illustrates results of comparison of cell voltages when the temperature of the fuel cell is high and the output power is high between the first embodiment and a first comparative example.
Figure 6B:
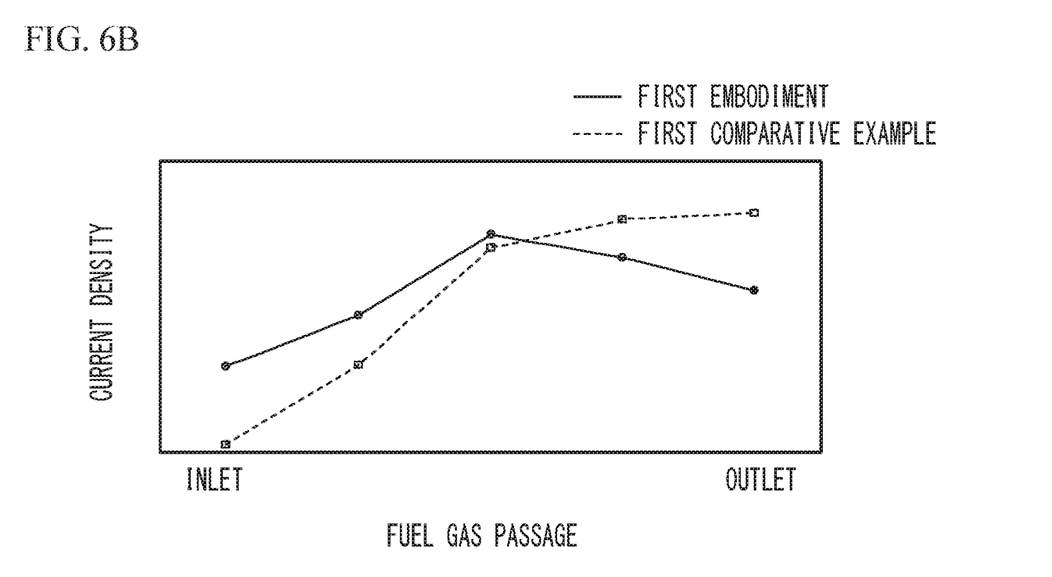
FIG. 6B illustrates results of comparison of current density distributions when the temperature of the fuel cell is high and the output power is high between the first embodiment and the first comparative example.

FIG. 6A illustrates results of comparison of cell voltages in the high-temperature high output power state between the first embodiment and the first comparative example, and FIG. 6B illustrates results of comparison of current density distributions in the high-temperature high output power state between the first embodiment and the first comparative example. FIG. 6A and FIG. 6B illustrate measurement results when the temperature of the fuel cell 10 is 100° C., the pressure in the vicinity of the anode inlet of the fuel cell 10 and the pressure in the vicinity of the cathode inlet of the fuel cell 10 are fixed to respective predetermined pressures, the dew-point temperature of the fuel gas to be supplied to the fuel gas passage 18 is 45° C., and an unhumidified oxidant gas is supplied to the oxidant gas passage 19. The vertical axis in FIG. 6A represents the cell voltage when the current density is 3.2 A/cm$^2$.

As illustrated in FIG. 6A, the power generation performance in the high-temperature high output power state is improved in the first embodiment compared to that in the first comparative example. As illustrated in FIG. 6B, the current density distribution in the high-temperature high output power state in the first embodiment is improved compared to that in the first comparative example. When the fuel cell 10 is in the high-temperature high output power state, as described in FIG. 3B, the humidity in the vicinity of the inlet 20 of the fuel gas passage 18 is low, and the power generation performance in the vicinity of the inlet 20 of the fuel gas passage 18 is thus low. In the first embodiment, when the fuel cell 10 is in the high-temperature high output power state, the stoichiometric ratio of the oxidant gas is made to be greater than the stoichiometric ratio of the oxidant gas when the fuel cell 10 is in the high-temperature low output power state. Thus, the oxygen partial pressure in the oxidant gas passage 19 facing the inlet 20 of the fuel gas passage 18 can be increased, the amount of water produced through the power generation increases, and thereby, the amount of water moving from the cathode to the anode in the vicinity of the inlet 20 of the fuel gas passage 18 can be increased. Thus, it is considered that drying in the vicinity of the inlet 20 of the fuel gas passage 18 is reduced, the current density in the vicinity of the inlet 20 of the fuel gas passage 18 is improved as illustrated in FIG. 6B, and as a result, the power generation performance is improved as illustrated in FIG. 6A.

As described above, in the first embodiment, the control unit 80 controls the air compressor 32 so that the stoichiometric ratio of the oxidant gas in the high-temperature high output power state is greater (e.g., 1.65) than the stoichiometric ratio of the oxidant gas in the high-temperature low output power state (e.g., 1.3). This control reduces drying of the electrolyte film 12 in the vicinity of the inlet 20 of the fuel gas passage 18 as described in FIG. 6A and FIG. 6B, and as a result, the power generation performance is improved. When the fuel cell 10 is in the high-temperature high output power state, the stoichiometric ratio of the fuel gas may be made to be less than that in the normal condition to improve the power generation performance as described in International Publication No. 2014/017028. However, when the stoichiometric ratio of the fuel gas is made to be too small, the shortage of supply of the fuel gas may occur in a part of the fuel cell 10, and the catalyst of the fuel cell may deteriorate. In contrast, when the stoichiometric ratio of the oxidant gas is increased as in the first embodiment, the power generation performance can be improved without concerning about the deterioration of the catalyst.

In addition, in the first embodiment, the control unit 80 controls the air compressor 32 so that the stoichiometric ratio of the oxidant gas in the high-temperature high output power state is greater (e.g., 1.65) than the stoichiometric ratio of the oxidant gas in the high-temperature low output power state (e.g., 1.3) and the stoichiometric ratio of the oxidant gas when the temperature of the fuel cell 10 is equal to or less than the predetermined temperature (e.g., 1.5). This control improves the power generation performance as described in FIG. 6A and FIG. 6B.

Second Embodiment

Figure 7:
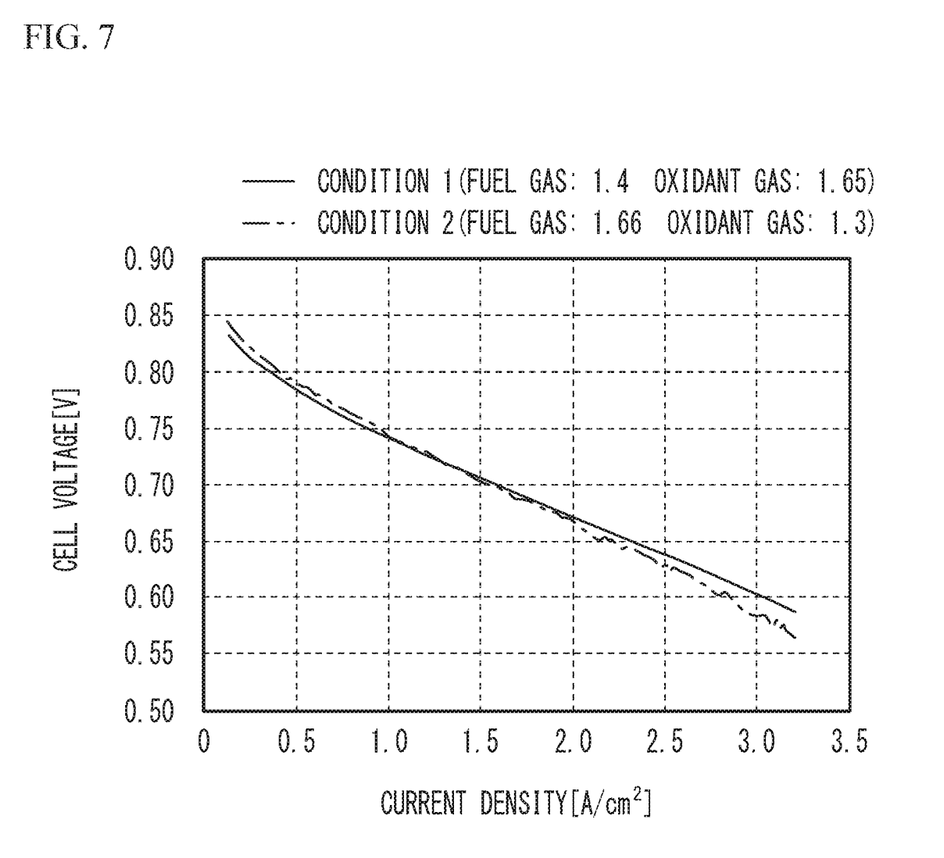
FIG. 7 illustrates measurement results of the current-voltage characteristics (I-V characteristics) of the fuel cell when the temperature of the fuel cell is high.

A description will be given of the current-voltage characteristics (I-V characteristics) of the fuel cell 10 when the temperature of the fuel cell 10 is high. FIG. 7 illustrates measurement results of the current-voltage characteristics (I-V characteristics) when the temperature of the fuel cell 10 is high. The horizontal axis in FIG. 7 represents the current density (A/cm$^2$), and the vertical axis represents the cell voltage (V). FIG. 7 illustrates measurement results of the IV characteristics of two cases between which the stoichiometric ratio of the fuel gas supplied to the fuel gas passage 18 and the stoichiometric ratio of the oxidant gas supplied to the oxidant gas passage 19 differ. The case where the stoichiometric ratio of the fuel gas is 1.4 and the stoichiometric ratio of the oxidant gas is 1.65 is indicated as a condition 1 by a solid line in FIG. 7. The case where the stoichiometric ratio of the fuel gas is 1.66 and the stoichiometric ratio of the oxidant gas is 1.3 is indicated as a condition 2 by a chain line in FIG. 7. The IV characteristics of FIG. 7 are measured under the following conditions. That is, the evaluation was conducted by setting the temperature of the fuel cell 10 to 100° C. and fixing the pressure in the vicinity of the anode inlet of the fuel cell 10 and the pressure in the vicinity of the cathode inlet of the fuel cell 10 to respective predetermined pressures. The fuel gas having a dew-point temperature of 45° C. was supplied to the fuel gas passage 18, and an unhumidified oxidant gas was supplied to the oxidant gas passage 19.

As illustrated in FIG. 7, in an intermediate output power region in which the current density is 1.0 A/cm$^2$ or greater and 1.5 A/cm$^2$ or less, the cell voltage is approximately the same between the condition 1 and the condition 2. On the other hand, in a low output power region in which the current density is less than 1.0 A/cm², the cell voltage under the condition 2 is higher than the cell voltage under the condition 1. In a high output power region in which the current density is greater than 1.5 A/cm², the cell voltage under the condition 1 is higher than the cell voltage under the condition 2.

The reason why the power generation performance is improved by increasing the stoichiometric ratio of the fuel gas and reducing the stoichiometric ratio of the oxidant gas when the output power is low is considered as follows. That is, when the fuel cell 10 is in the high-temperature low output power state, the humidity in the vicinity of the outlet 21 of the fuel gas passage 18 is low as illustrated in FIG. 3A, and as a result, the power generation performance in the vicinity of the outlet 21 of the fuel gas passage 18 is low. In this case, by increasing the stoichiometric ratio of the fuel gas, the amount of water delivered by the fuel gas to the outlet 21 of the fuel gas passage 18 increases, and drying in the vicinity of the outlet 21 of the fuel gas passage 18 is reduced. In addition, by reducing the stoichiometric ratio of the oxidant gas, dry air is inhibited from being excessively supplied, and drying in the vicinity of the outlet 21 of the fuel gas passage 18 is reduced. This is considered the reason why the power generation performance is improved.

On the other hand, the reason why the power generation performance is improved by reducing the stoichiometric ratio of the fuel gas and increasing the stoichiometric ratio of the oxidant gas when the output power is high is considered as follows. That is, when the fuel cell 10 is in the high-temperature high output power state, the humidity in the vicinity of the inlet 20 of the fuel gas passage 18 is low as illustrated in FIG. 3B, and as a result, the power generation performance in the vicinity of the inlet 20 of the fuel gas passage 18 is low. In this case, by reducing the stoichiometric ratio of the fuel gas, a fuel gas with low humidity is inhibited from being excessively supplied, and drying in the vicinity of the inlet 20 of the fuel gas passage 18 is reduced. In addition, since the oxygen partial pressure in the oxidant gas passage 19 facing the inlet 20 of the fuel gas passage 18 is increased by increasing the stoichiometric ratio of the oxidant gas, the amount of water produced through the power generation increases, the amount of water moving from the cathode to the anode in the vicinity of the inlet 20 of the fuel gas passage 18 increases, and thereby, drying in the vicinity of the inlet 20 of the fuel gas passage 18 is reduced. This is considered the reason why the power generation performance is improved. Although FIG. 7 illustrates the experiment results when the temperature of the fuel cell 10 is 100° C., as described in FIG. 5, when the temperature of the fuel cell 10 exceeds 70° C., the electrolyte film 12 tends to dry, and the power generation performance decreases. Thus, it can be said that the same result as that in FIG. 7 is obtained when the temperature of the fuel cell 10 exceeds 70° C.

Based on these facts, a second embodiment that reduces drying of the fuel cell 10 and improves the power generation performance will be described. The structure of the fuel cell system in accordance with the second embodiment is the same as that of the first embodiment, and the description thereof is thus omitted. In addition, the drying reduction process in the second embodiment is the same as that of the first embodiment except step S18 in FIG. 4, and thus step S18 will be described. In the second embodiment, at step S18 in FIG. 4, the control unit 80 sets, as the stoichiometric ratios for high output power, the stoichiometric ratio of the fuel gas to the stoichiometric ratio (e.g., 1.4) that is less than the stoichiometric ratio for low output power (e.g., 1.66), and sets the stoichiometric ratio of the oxidant gas to the stoichiometric ratio (e.g., 1.65) that is greater than the stoichiometric ratio for low output power (e.g., 1.3).

As described above, in the second embodiment, when the fuel cell 10 is in the high-temperature high output power state, the stoichiometric ratio of the fuel gas is made to be less than the stoichiometric ratio of the fuel gas when the fuel cell 10 is in the high-temperature low output power state and the stoichiometric ratio of the oxidant gas is made to be greater than the stoichiometric ratio of the oxidant gas when the fuel cell 10 is in the high-temperature low output power state. Here, an example in which the stoichiometric ratio of the fuel gas and the stoichiometric ratio of the oxidant gas are made to be equal to those in the high-temperature low output power state even when the fuel cell 10 is in the high-temperature high output power state is defined as the first comparative example. In addition, examples in which the stoichiometric ratio of the fuel gas is made to be less than the stoichiometric ratio of the fuel gas when the fuel cell 10 is in the high-temperature low output power state and the stoichiometric ratio of the oxidant gas is made to be equal to the stoichiometric ratio of the oxidant gas when the fuel cell 10 is in the high-temperature low output power state when the fuel cell 10 is in the high-temperature high output power state are defined as a first reference example and a second reference example. Table 2 lists the examples of the stoichiometric ratio of the fuel gas and the stoichiometric ratio of the oxidant gas in the first embodiment, the second embodiment, the first comparative example, the first reference example, and the second reference example.

TABLE 2

| | | Fuel gas stoichiometric ratio | Oxidant gas stoichiometric ratio |
|---|---|---|---|
| First embodiment | High-temperature low output power state | 1.66 | 1.3 |
| | High-temperature high output power state | 1.66 | 1.65 |
| Second Embodiment | High-temperature low output power state | 1.66 | 1.3 |
| | High-temperature high output power state | 1.4 | 1.65 |
| First comparative example | High-temperature low output power state | 1.66 | 1.3 |
| | High-temperature high output power state | 1.66 | 1.3 |
| First reference example | High-temperature low output power state | 1.66 | 1.3 |
| | High-temperature high output power state | 1.2 | 1.3 |
| Second reference example | High-temperature low output power state | 1.66 | 1.3 |
| | High-temperature high output power state | 1.4 | 1.3 |

Figure 8A:
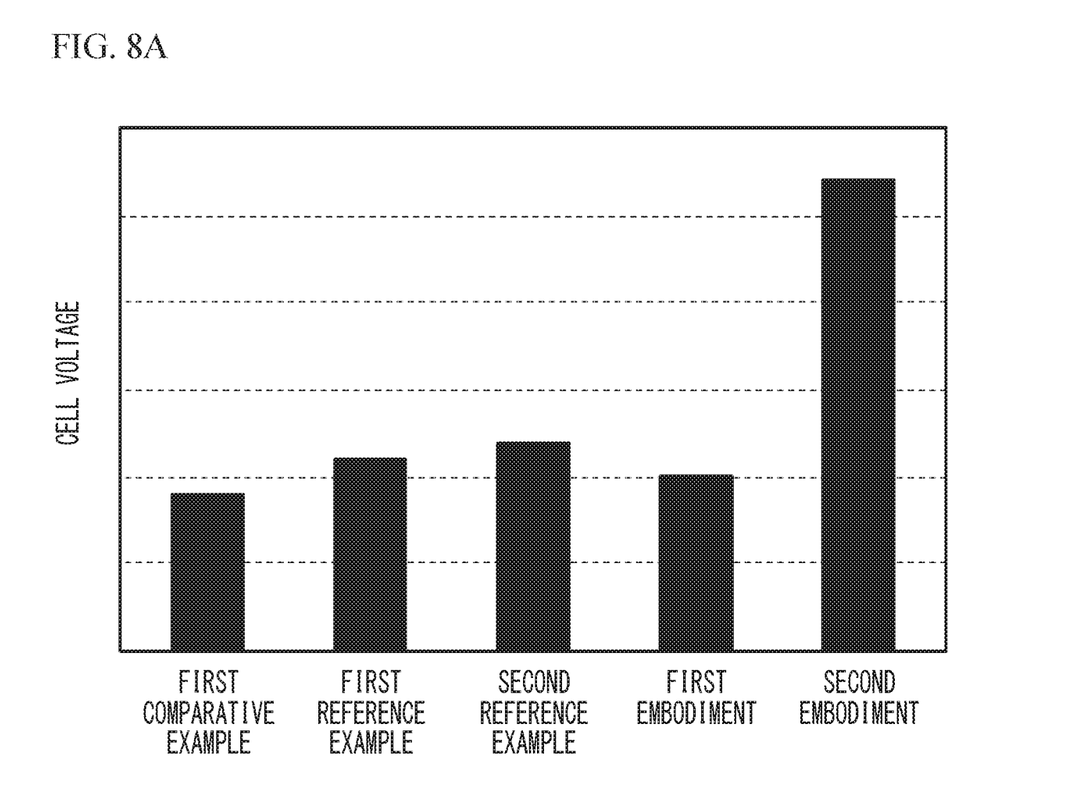
FIG. 8A illustrates results of comparison of cell voltages when the temperature of the fuel cell is high and the output power is high among the first embodiment, a second embodiment, the first comparative example, a first reference example, and a second reference example.
Figure 8B:
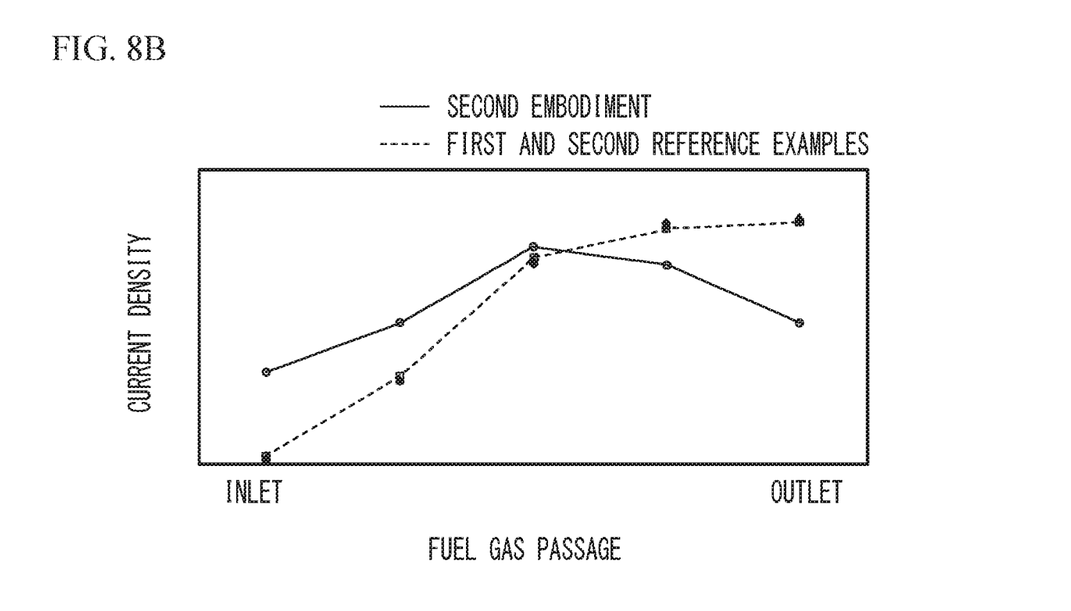
FIG. 8B illustrates results of comparison of current density distributions when the temperature of the fuel cell is high and the output power is high among the second embodiment, the first comparative example, the first reference example, and the second reference example.

FIG. 8A illustrates results of comparison of cell voltages in the high-temperature high output power state among the first embodiment, the second embodiment, the first comparative example, the first reference example, and the second reference example, and FIG. 8B illustrates results of comparison of current density distributions in the high-temperature high output power state among the second embodiment, the first comparative example, the first reference example, and the second reference example. FIG. 8A and FIG. 8B illustrate measurement results when the temperature of the fuel cell 10 is 100° C., the pressure in the vicinity of the anode inlet of the fuel cell 10 and the pressure in the vicinity of the cathode inlet of the fuel cell 10 are fixed to respective predetermined pressures, the dew-point temperature of the fuel gas to be supplied to the fuel gas passage 18 is 45° C., and an unhumidified oxidant gas is supplied to the oxidant gas passage 19. The vertical axis in FIG. 8A represents the cell voltage when the current density is 3.2 A/cm$^2$.

As illustrated in FIG. 8A, the second embodiment greatly improves the power generation performance compared to the first comparative example, the first reference example, and the second reference example. In the second embodiment, obtained is the improved amount of the cell voltage that is equal to or greater than the sum of the improved amount of the cell voltage in the first embodiment, which increases only the stoichiometric ratio of the oxidant gas without changing the stoichiometric ratio of the fuel gas, and the improved amount of the cell voltage in the first or second reference example, which reduces only the stoichiometric ratio of the fuel gas without changing the stoichiometric ratio of the oxidant gas. As illustrated in FIG. 8B, in the second embodiment, the current density distribution from the inlet 20 of the fuel gas passage 18 to the outlet 21 of the fuel gas passage 18 is improved compared to those in the first comparative example, the first reference example, and the second reference example. In FIG. 8B, the current density distribution is approximately the same among the first comparative example, the first reference example, and the second reference example, and thus is indicated by a single dotted line for clarity. As described in FIG. 7, in the high-temperature high output power state, the fuel gas with low humidity is inhibited from being excessively supplied by reducing the stoichiometric ratio of the fuel gas, and the amount of water moving from the cathode to the anode in the vicinity of the inlet 20 of the fuel gas passage 18 is increased by increasing the stoichiometric ratio of the oxidant gas. Accordingly, drying in the vicinity of the inlet 20 of the fuel gas passage 18 is reduced. It is considered that in the second embodiment, since the stoichiometric ratio of the fuel gas is decreased and the stoichiometric ratio of the oxidant gas is increased in the high-temperature high output power state, drying in the vicinity of the inlet 20 of the fuel gas passage 18 is reduced, the current density in the vicinity of the inlet 20 of the fuel gas passage 18 is improved as illustrated in FIG. 8B, and the power generation performance is improved as illustrated in FIG. 8A.

As described above, in the second embodiment, the control unit 80 controls the air compressor 32 so that the stoichiometric ratio of the oxidant gas in the high-temperature high output power state is greater than the stoichiometric ratio of the oxidant gas in the high-temperature low output power state, and controls the hydrogen supply unit 45 so that the stoichiometric ratio of the fuel gas in the high-temperature high output power state is less than the stoichiometric ratio of the fuel gas in the high-temperature low output power state. This control reduces drying of the electrolyte film 12 in the vicinity of the inlet 20 of the fuel gas passage 18, thereby improving the current density as described in FIG. 8A and FIG. 8B. As a result, the power generation performance is improved. As in the second embodiment, by increasing the stoichiometric ratio of the oxidant gas in the high-temperature high output power state and reducing the stoichiometric ratio of the fuel gas in the high-temperature high output power state, a large improvement in the power generation performance, which is equal to or greater than the sum of the improved amount of the power generation performance when only the stoichiometric ratio of the oxidant gas is increased as in the first embodiment and the improved amount of the power generation performance when only the stoichiometric ratio of the fuel gas is reduced as in the first or second reference example, is obtained as illustrated in FIG. 8A.

In addition, in the second embodiment, the control unit 80 controls the air compressor 32 so that the stoichiometric ratio of the oxidant gas in the high-temperature high output power state is greater (e.g., 1.65) than the stoichiometric ratio of the oxidant gas in the high-temperature low output power state (e.g., 1.3) and the stoichiometric ratio of the oxidant gas when the temperature of the fuel cell 10 is equal to or less than the predetermined temperature (e.g., 1.5). In addition, the control unit 80 controls the hydrogen supply unit 45 so that the stoichiometric ratio of the fuel gas in the high-temperature high output power state is a value between the stoichiometric ratio of the fuel gas in the high-temperature low output power state (e.g., 1.66) and the stoichiometric ratio of the fuel gas when the temperature of the fuel cell 10 is equal to or less than the predetermined temperature (e.g., 1.25). These controls greatly improve the power generation performance as illustrated in FIG. 8A and FIG. 8B.

The first and second embodiments describe a case where the current density of the fuel cell 10 is greater than 1.0 A/cm$^2$ as an example of the case where the power generation amount of the fuel cell 10 is greater than the predetermined power generation amount, but do not intend to suggest any limitation. As illustrated in FIG. 7, when the current density is 1.0 A/cm$^2$ or greater, the power generation performance under the condition 1 in which the stoichiometric ratio of the oxidant gas is increased and the stoichiometric ratio of the fuel gas is decreased is equal to or greater than the power generation performance under the condition 2. Thus, the case where the current density of the fuel cell 10 is greater than a predetermined current density of 1.0 A/cm$^2$ or greater may be considered as the case where the power generation amount of the fuel cell 10 is greater than the predetermined power generation amount. In addition, as illustrated in FIG. 7, since the power generation performance under the condition 1 is equal to or greater than the power generation performance under the condition 2 when the current density is equal to or greater than 1.0 A/cm$^2$, the predetermined current density may be 1.2 A/cm$^2$, may be 1.5 A/cm$^2$, or may be 2.0 A/cm$^2$.

In the first and second embodiments, the determination as to whether the power generation amount of the fuel cell 10 is greater than the predetermined power generation amount may be made by using the output current, the voltage, or the power of the fuel cell 10 instead of the current density of the fuel cell 10. For example, as illustrated in FIG. 7, when the voltage of the fuel cell 10 is 0.75 V or less, the power generation performance under the condition 1 in which the stoichiometric ratio of the oxidant gas is increased and the stoichiometric ratio of the fuel gas is decreased is equal to or greater than the power generation performance under the condition 2. Thus, the case where the voltage of the fuel cell 10 is less than a predetermined voltage of 0.75 V or less may be considered as the case where the power generation amount of the fuel cell 10 is greater than the predetermined power generation amount. In addition, as illustrated in FIG. 7, when the voltage is 0.75 V or less, the power generation performance under the condition 1 is equal to or greater than the power generation performance under the condition 2. Thus, the predetermined voltage may be 0.70 V, may be 0.65V, or may be 0.60 V.

In the first and second embodiments, the determination as to whether the power generation amount of the fuel cell 10 is greater than the predetermined power generation amount or is equal to or less than the predetermined power generation amount may be made by using at least two of the current density, the output current, the voltage, the power of the fuel cell 10. This configuration inhibits the determination as to whether the power generation amount of the fuel cell 10 is greater than the predetermined power generation amount or is equal to or less than the predetermined power generation amount from being erroneously made even when one of the current sensor 1 or the voltage sensor 2 malfunctions.

Figure 9A:
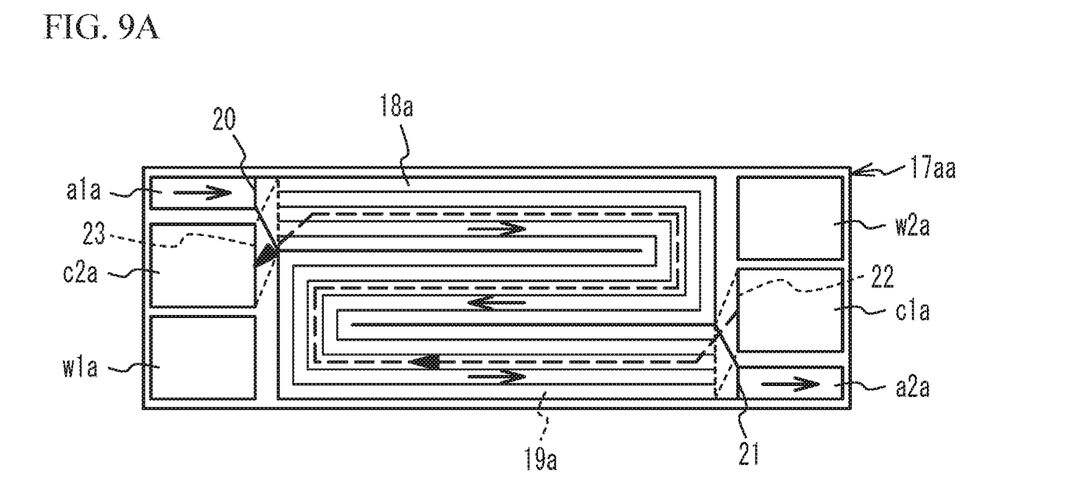
FIG. 9A is a plan view of a unit cell in accordance with a first variation as viewed from the anode separator side.
Figure 9B:
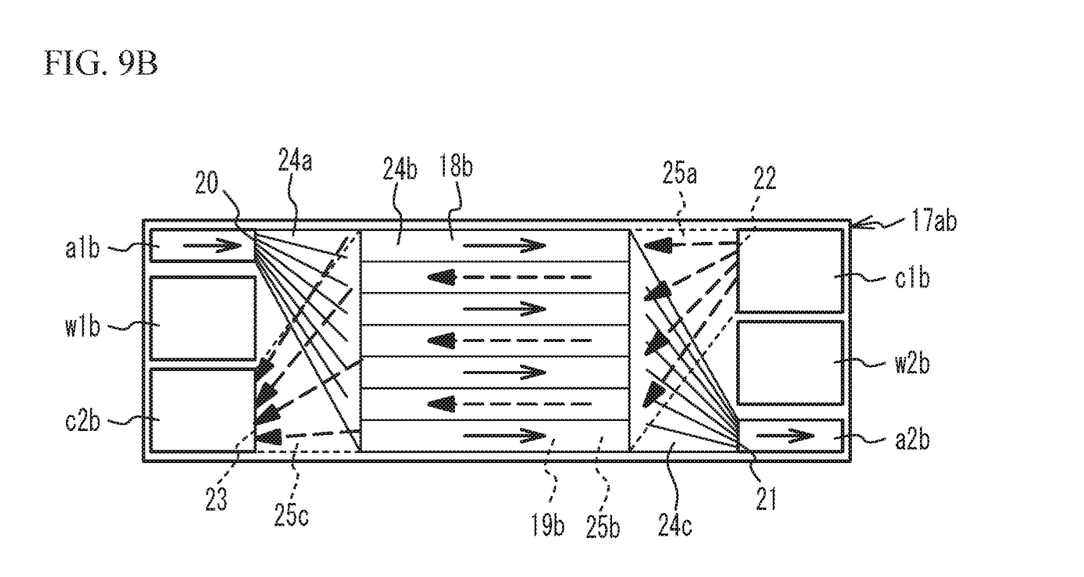
FIG. 9B is a plan view of a unit cell in accordance with a second variation as viewed from the anode separator side.

FIG. 9A is a plan view of a unit cell in accordance with a first variation as viewed from the anode separator side, and FIG. 9B is a plan view of a unit cell in accordance with a second variation as viewed from the anode separator side. As illustrated in FIG. 9A, in the unit cell of the first variation, an anode inlet a1a, a cathode outlet c2a, and a coolant inlet w1a are formed side by side in the short direction at a first side of the short sides of an anode separator 17aa with a substantially rectangular shape. A coolant outlet w2a, a cathode inlet c1a, and an anode outlet a2a are formed side by side in the short direction at a second side of the short sides of the anode separator 17aa. Although the illustration is omitted, the cathode separator of the unit cell of the first variation also has a substantially rectangular shape as with the anode separator 17aa, and has the anode inlet a1a, the anode outlet a2a, the cathode inlet c1a, the cathode outlet c2a, the coolant inlet w1a, and the coolant outlet w2a formed therein. The positions of the coolant inlet w1a and the coolant outlet w2a are not particularly limited. For example, the coolant inlet w1a and the coolant outlet w2a may be arranged in an opposite manner to those in FIG. 9A, and the direction in which coolant flows may be opposite to the direction in FIG. 9A.

The anode inlet a1a is adjacent to the cathode outlet c2a, and the anode outlet a2a is adjacent to the cathode inlet c1a. That is, the anode inlet a1a is located closer to the cathode outlet c2a than to the cathode inlet c1a, and the anode outlet a2a is located closer to the cathode inlet c a than to the cathode outlet c2a. Formed in the cathode separator of the unit cell in accordance with the first variation is an oxidant gas passage 19a that guides the oxidant gas from the cathode inlet c1a to the cathode outlet c2a. The oxidant gas passage 19a is a serpentine passage as with a fuel gas passage 18a. The inlet 20 of the fuel gas passage 18a is located closer to the outlet 23 of the oxidant gas passage 19a than to the inlet 22 of the oxidant gas passage 19a, and the outlet 21 of the fuel gas passage 18a is located closer to the inlet 22 of the oxidant gas passage 19a to the outlet 23 of the oxidant gas passage 19a. In FIG. 9A, the direction in which the fuel gas flows is indicated by solid line arrows, and the direction in which the oxidant gas flows is indicated by dashed line arrows. As described above, also in the unit cell of the first variation, the fuel gas and the oxidant gas flow in a substantially counter-flow manner.

As illustrated in FIG. 9B, in the unit cell of the second variation, an anode inlet a1b, a coolant inlet w1b, and a cathode outlet c2b are formed side by side in the short direction at a first side of the short sides of an anode separator 17ab having a substantially rectangular shape. A cathode inlet c1b, a coolant outlet w2b, and an anode outlet a2b are formed side by side in the short direction at a second side of the short sides of the anode separator 17ab. Although the illustration is omitted, the cathode separator of the unit cell of the second variation also has a substantially rectangular shape as with the anode separator 17ab, and have the anode inlet a1b, the anode outlet a2b, the cathode inlet c1b, the cathode outlet c2b, the coolant inlet w1b, and the coolant outlet w2b formed therein.

The anode inlet a1b is adjacent to the cathode outlet c2b through the coolant inlet w1b, and the anode outlet a2b is adjacent to the cathode inlet c1b through the coolant outlet w2b. That is, the anode inlet a1b is located closer to the cathode outlet c2b than to the cathode inlet c b, and the anode outlet a2b is located closer to the cathode inlet c1b than to the cathode outlet c2b. The positions of the coolant inlet w1b and the coolant outlet w2b are not particularly limited. For example, the coolant inlet w1b and the coolant outlet w2b are arranged in an opposite manner to those in FIG. 9B, and the direction in which the coolant flows may be opposite to the direction in FIG. 9B.

A fuel gas passage 18b guides the fuel gas from the anode inlet a1b to the anode outlet a2b, and has a distribution part 24a, parallel parts 24b, and a gathering part 24c in this order from the upstream side. The distribution part 24a extends so as to widen from the anode inlet a1b to the parallel part 24b. The parallel parts 24b extend substantially in parallel to the long direction of the anode separator 17ab. The gathering part 24c extends so as to narrow from the parallel part 24b to the anode outlet a2b. Formed in the cathode separator of the unit cell in accordance with the second variation is an oxidant gas passage 19b that guides the oxidant gas from the cathode inlet c1b to the cathode outlet c2b. The oxidant gas passage 19b has a distribution part 25a, which extends so as to widen from the cathode inlet c1b to the center part, parallel parts 25b, which extend substantially in parallel to the long direction in the center part, and a gathering part 25c, which extends so as to narrow from the center part to the cathode outlet c2b, as with the fuel gas passage 18b.

The inlet 20 of the fuel gas passage 18b is located closer to the outlet 23 of the oxidant gas passage 19b than to the inlet 22 of the oxidant gas passage 19b, and the outlet 21 of the fuel gas passage 18b is located closer to the inlet 22 of the oxidant gas passage 19b than to the outlet 23 of the oxidant gas passage 19b. In FIG. 9B, the direction in which the fuel gas flows is indicated by solid line arrows, and the direction in which the oxidant gas flows is indicated by dashed line arrows. As described above, also in the unit cell of the second variation, the fuel gas and the oxidant gas flow in a substantially counter-flow manner.

In both the first and second variations, as with the case illustrated in FIG. 2B, the inlet of the fuel gas passage is located closer to the outlet of the oxidant gas passage than to the inlet of the oxidant gas passage, the outlet of the fuel gas passage is located closer to the inlet of the oxidant gas passage than to the outlet of the oxidant gas passage, and the fuel gas and the oxidant gas flow in a substantially counter-flow manner. Therefore, even in the structures of the first and second variations, as in the first embodiment, when the fuel cell 10 is in the high-temperature high output power state, the power generation performance is improved by controlling the air compressor 32 so that the stoichiometric ratio of the oxidant gas is higher than the stoichiometric ratio of the oxidant gas when the fuel cell 10 is in the high-temperature low output power state. In addition, even in the structures of the first and second variations, as in the second embodiment, when the fuel cell 10 is in the high-temperature high output power state, the power generation performance is improved by controlling the air compressor 32 so that the stoichiometric ratio of the oxidant gas is higher than the stoichiometric ratio of the oxidant gas when the fuel cell 10 is in the high-temperature low output power state and controlling the hydrogen supply unit 45 so that the stoichiometric ratio of the fuel gas is less than the stoichiometric ratio of the fuel gas when the fuel cell 10 is in the high-temperature low output power state.

The first and second embodiments describe a case where the control unit 80 obtains, as the power generation amount of the fuel cell 10, the amount of power actually generated by the fuel cell 10 based on the current sensor 1 and/or the voltage sensor 2, but do not intend to suggest any limitation. For example, the control unit 80 may obtain, as the power generation amount of the fuel cell 10, the power generation amount based on the requested output value to the fuel cell 10 calculated based on the accelerator pedal sensor 92.

Although some embodiments of the present disclosure have been described in detail, the present disclosure is not limited to the specific embodiments but may be varied or changed within the scope of the present disclosure as claimed.

What is claimed is:

1. A fuel cell system comprising:
   a fuel cell including a fuel gas passage through which a fuel gas flows and an oxidant gas passage through which an oxidant gas flows, an inlet of the fuel gas passage being located closer to an outlet of the oxidant gas passage than to an inlet of the oxidant gas passage, an outlet of the fuel gas passage being located closer to the inlet of the oxidant gas passage than to the outlet of the oxidant gas passage;
   an oxidant gas supply unit supplying the oxidant gas to the fuel cell; and
   a supply amount controller configured to control the oxidant gas supply unit to control a supply amount of the oxidant gas to the fuel cell,
   wherein the supply amount controller is configured to control the oxidant gas supply unit so that a stoichiometric ratio of the oxidant gas in a high-temperature high output power state is greater than a stoichiometric ratio of the oxidant gas in a high-temperature low output power state, the high-temperature high output power state being a state where a temperature of the fuel cell is higher than a predetermined temperature and a power generation amount of the fuel cell is greater than a predetermined power generation amount, the high-temperature low output power state being a state where the temperature of the fuel cell is higher than the predetermined temperature and the power generation amount of the fuel cell is equal to or less than the predetermined power generation amount.

2. The fuel cell system according to claim 1, further comprising:
   a fuel gas supply unit supplying the fuel gas to the fuel cell, wherein
   the supply amount controller is configured to control the fuel gas supply unit to control a supply amount of the fuel gas to the fuel cell, and
   the supply amount controller is configured to control the fuel gas supply unit so that a stoichiometric ratio of the fuel gas in the high-temperature high output power state is less than a stoichiometric ratio of the fuel gas in the high-temperature low output power state.

3. The fuel cell system according to claim 1, wherein the supply amount controller is configured to control the oxidant gas supply unit so that the stoichiometric ratio of the oxidant gas in the high-temperature high output power state is greater than the stoichiometric ratio of the oxidant gas in the high-temperature low output power state and a stoichiometric ratio of the oxidant gas when the temperature of the fuel cell is equal to or less than the predetermined temperature.

4. The fuel cell system according to claim 2, wherein the supply amount controller is configured to control the oxidant gas supply unit so that the stoichiometric ratio of the oxidant gas in the high-temperature high output power state is greater than the stoichiometric ratio of the oxidant gas in the high-temperature low output power state and a stoichiometric ratio of the oxidant gas when the temperature of the fuel cell is equal to or less than the predetermined temperature, and
   the supply amount controller is configured to control the fuel gas supply unit so that the stoichiometric ratio of the fuel gas in the high-temperature high output power state is a value between the stoichiometric ratio of the fuel gas in the high-temperature low output power state and a stoichiometric ratio of the fuel gas when the temperature of the fuel cell is equal to or less than the predetermined temperature.

5. The fuel cell system according to claim 1, wherein the predetermined temperature is 70° C. or greater.

6. The fuel cell system according to claim 1, wherein the power generation amount of the fuel cell is considered to be greater than the predetermined power generation amount when a current density of the fuel cell is greater than a predetermined current density of 1.0 A/cm2 or greater.

7. The fuel cell system according to claim 1, wherein the power generation amount of the fuel cell is considered to be greater than the predetermined power generation amount when a voltage of the fuel cell is less than a predetermined voltage of 0.75 V or less.

* * * * *

UNITED STATES PATENT AND TRADEMARK OFFICE
CERTIFICATE OF CORRECTION

PATENT NO. : 10,886,547 B2
APPLICATION NO. : 16/270885
DATED : January 5, 2021
INVENTOR(S) : Tetsuya Shimomura, Masashi Maeda and Norimitsu Takeuchi It is certified that error appears in the above-identified patent and that said Letters Patent is hereby corrected as shown below:

In the Specification

In Column 17, Line(s) 46, delete "c a" and insert --c1a--, therefor.

In Column 18, Line(s) 14, delete "c b" and insert --c1b--, therefor.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*